(12) United States Patent
Men et al.

(10) Patent No.: US 11,637,704 B2
(45) Date of Patent: Apr. 25, 2023

(54) METHOD AND APPARATUS FOR DETERMINING TRUST STATUS OF TPM, AND STORAGE MEDIUM

(71) Applicant: HUAWEI TECHNOLOGIES CO., LTD., Shenzhen (CN)

(72) Inventors: Fanglong Men, Brussels (BE); Honglei Wang, Dongguan (CN); Fangzhan Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 487 days.

(21) Appl. No.: 16/908,617

(22) Filed: Jun. 22, 2020

(65) Prior Publication Data
US 2020/0322158 A1 Oct. 8, 2020

Related U.S. Application Data

(63) Continuation of application No. PCT/CN2018/122188, filed on Dec. 19, 2018.

(30) Foreign Application Priority Data

Dec. 22, 2017 (CN) .......................... 201711403413.4

(51) Int. Cl.
*H04L 29/06* (2006.01)
*H04L 9/32* (2006.01)
*H04L 9/08* (2006.01)

(52) U.S. Cl.
CPC .......... *H04L 9/3234* (2013.01); *H04L 9/0877* (2013.01); *H04L 9/0894* (2013.01); *H04L 9/3271* (2013.01); *H04L 2209/127* (2013.01)

(58) Field of Classification Search
CPC ... H04L 9/3234; H04L 9/0877; H04L 9/0894; H04L 9/3271; H04L 2209/127; G06F 21/57
See application file for complete search history.

(56) References Cited

U.S. PATENT DOCUMENTS

2008/0320308 A1* 12/2008 Kostiainen ............ H04L 63/123
713/171
2017/0041147 A1* 2/2017 Krahn ................... H04L 9/0877
(Continued)

FOREIGN PATENT DOCUMENTS

CN 101477602 A 7/2009
CN 101951388 A 1/2011
(Continued)

OTHER PUBLICATIONS

Sungjin Park et al. "TGVisor: A Tiny Hypervisor-Based Trusted Geolocation Framework for Mobile cloud Clients",2015 3rd IEEE International Conference on Mobile Cloud Computing, Services, and Engineering, Jan. 1, 2015 (Year: 2015).*
(Continued)

*Primary Examiner* — Yogesh Paliwal
(74) *Attorney, Agent, or Firm* — Rimon Law

(57) ABSTRACT

Various embodiments provide a method and an apparatus for determining a trust status of a TPM, and a storage medium, and pertains to the field of data security technologies. In those embodiments, a verifier send an unsealing request to a host, so that the host unseals current PCR values in the TPM based on a seal key handle carried in the unsealing request, and sends verification information to the verifier based on the unseal verification key obtained after the unsealing. Therefore, any verifier that establishes an encrypted channel with the host can determine the trust status of the TPM in the host based on a second verification key transmitted on the encrypted channel, and there is no need to pre-deploy a remote attestation server to determine the trust status of the TPM.

18 Claims, 4 Drawing Sheets

(56) References Cited

U.S. PATENT DOCUMENTS

2018/0293390 A1* 10/2018 Baker ................. G06F 21/6218
2019/0081798 A1*  3/2019 Fu ........................... G06F 21/60
2019/0123903 A1*  4/2019 Fu ........................... H04L 9/321

FOREIGN PATENT DOCUMENTS

| CN | 102045356 A | 5/2011 |
| CN | 105873031 A | 8/2016 |
| CN | 107104804 A | 8/2017 |

OTHER PUBLICATIONS

XP032339573 Tianwei Zhang et al.,"Security Verification of Hardware-enabled Attestation Protocols",2012 IEEE/ACM 45th International Symposium on Microarchitecture Workshops, Jan. 1, 2012, total 8 pages.
XP032789417 Sungjin Park et al.,"TGVisor: A Tiny Hypervisor-Based Trusted Geolocation Framework for Mobile Cloud Clients",2015 3rd IEEE International Conference on Mobile Cloud Computing, Services, and Engineering, Jan. 1, 2015, total 10 pages.
ETSI GR NFV-SEC 007 V1.1.1 (Oct. 2017),Network Functions Virtualisation (NFV);Trust;Report on Attestation Technologies and Practices for Secure Deployments,total 32 pages.

* cited by examiner

METHOD AND APPARATUS FOR DETERMINING TRUST STATUS OF TPM, AND STORAGE MEDIUM

CROSS-REFERENCE TO RELATED APPLICATIONS

This application is a continuation of International Application No. PCT/CN2018/122188, filed on Dec. 19, 2018, which claims priority to Chinese Patent Application No. 201711403413.4, filed on Dec. 22, 2017. The aforementioned applications are hereby incorporated by reference in their entireties.

TECHNICAL FIELD

This application relates to the field of data security technologies, and in particular, to a method and an apparatus for determining a trust status of a trusted platform module (Trusted Platform Module, TPM), and a storage medium.

BACKGROUND

Currently, to prevent data in a host from being maliciously tampered with, a TPM is usually imbedded into the host. The TPM encrypts the data in the host and stores encrypted data, to improve security of the data in the host. If the TPM is in a trusted status, it indicates that the data in the TPM has not been maliciously tampered with. If the TPM is in an untrusted status, it indicates that the data in the TPM has been maliciously tampered with. In other words, a trust status of the TPM directly affects security of the data in the host. Therefore, how to determine the trust status of the TPM has become crucial.

In the related art, a platform configuration register (Platform Configuration Register, PCR) is disposed in a TPM of a host. The PCR is configured to record a digest value of data in the host. For ease of subsequent description, the digest value is referred to as a PCR value. When a trust status of the TPM needs to be determined, a pre-deployed remote attestation server sends a verification request to the host. When the host receives the verification request, the TPM in the host signs a current PCR value based on a local key of the host, to obtain a signed PCR value, and feeds back the signed PCR value to the remote attestation server. The remote attestation server compares the signed PCR value with a baseline value locally stored in the remote attestation server, to determine whether the signed PCR value and the baseline value are the same. If the signed PCR value and the baseline value are the same, it indicates that data corresponding to the PCR value has not been tampered with, in other words, the TPM is in a trusted status. If the signed PCR value and the baseline value are not the same, it indicates that data corresponding to the PCR value has been tampered with, in other words, the TPM is in an untrusted status.

In the foregoing method for determining the trust status of the TPM, a remote attestation server needs to be deployed independently, and the trust status of the TPM in the host is determined by using the remote attestation server. In other words, the foregoing method for determining the trust status of the TPM needs to be implemented by using the independently deployed remote attestation server. Consequently, flexibility of determining the trust status of the TPM is relatively poor.

SUMMARY

This application provides a method and an apparatus for determining a trust status of a TPM, and a storage medium, to resolve a problem that flexibility of determining the trust status of the TPM is relatively poor in the related art. The technical solutions are as follows:

According to a first aspect, a method for determining a trust status of a TPM is provided, where the method is applied to a host, the TPM is disposed in the host, and the method includes:

receiving an unsealing request sent by a verifier, where the unsealing request carries a seal key handle; and the seal key handle is sent by the host to the verifier after the host seals PCR values in the TPM based on a first verification key when the host is in an initialization status, the first verification key is obtained after a second verification key transmitted on an encrypted channel between the verifier and the host is encrypted based on a local key of the host, and the verifier is any party that needs to determine the trust status of the TPM;

unsealing current PCR values in the TPM based on the seal key handle, to obtain an unseal verification key; and determining verification information based on the unseal verification key, and sending the verification information to the verifier, to instruct the verifier to determine the trust status of the TPM based on the verification information.

In this application, when the verifier needs to determine the trust status of the TPM in the host, the verifier sends the unsealing request to the host. The host unseals the current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization status, and the first verification key is obtained after the second verification key transmitted on the encrypted channel between the verifier and the host is encrypted based on the local key of the host. Therefore, in this application, any verifier that establishes an encrypted channel with the host can determine the trust status of the TPM in the host by using a second verification key transmitted on the encrypted channel and through sealing/unsealing performed by the host on PCR values in the TPM, and there is no need to pre-deploy a remote attestation server to determine the trust status of the TPM in the host. This improves flexibility of determining the trust status of the TPM.

In some embodiments, the unsealing request further carries a challenge value, and the determining verification information based on the unseal verification key includes:

determining a mapping value of the challenge value based on the challenge value, where the mapping value of the challenge value is used to indicate an identity of the host;

determining trust status indication information based on the unseal verification key; and determining the trust status indication information and the mapping value of the challenge value as the verification information.

Further, to improve security of information transmission between the host and the verifier, the unsealing request sent by the verifier to the host further carries the challenge value, so that when the verifier receives information sent by the host subsequently, the verifier may determine, based on the challenge value, whether the identity of the host is valid.

In some embodiments, the determining trust status indication information based on the unseal verification key includes:

determining the trust status of the TPM based on whether the unseal verification key and the first verification key are the same, where the trust status is trusted or untrusted; and determining the trust status of the TPM as the trust status indication information.

In a possible implementation, the host may directly determine the trust status of the TPM based on the unseal verification key, and directly send the trust status of the TPM to the verifier.

In some embodiments, the local key of the host and a local key of the verifier are the same, and the determining trust status indication information based on the unseal verification key includes:

determining the unseal verification key as the trust status indication information.

In another possible implementation, when obtaining the unseal verification key, the host may send the unseal verification key to the verifier, and the verifier determines the trust status of the TPM based on the unseal verification key.

In some embodiments, before the receiving an unsealing request sent by a verifier, the method further includes:

when the host is currently in the initialization status, sealing the PCR values in the TPM based on the first verification key, to obtain the seal key handle; and sending the seal key handle to the verifier.

In this application, the host determines the trust status of the TPM by unsealing the current PCR values in the TPM. Therefore, before the unsealing, the PCR values in the TPM further needs to be sealed, to obtain the seal key handle required for the unsealing.

In some embodiments, before the sealing the PCR values in the TPM based on the first verification key, the method further includes:

obtaining the second verification key on the encrypted channel; and encrypting the second verification key based on the local key of the host, to obtain and store the first verification key.

Further, in this application, the host performs the sealing by directly using the first verification key obtained after the second verification key transmitted on the encrypted channel between the host and the verifier is encrypted. Therefore, before the sealing, the host further needs to determine the second verification key.

In some embodiments, the sending the seal key handle to the verifier includes:

decrypting the first verification key based on the local key of the host, to obtain the second verification key;

encrypting the seal key handle based on the second verification key, to obtain an encrypted seal key handle; and send the encrypted seal key handle to the verifier.

To ensure security of the seal key handle sent by the host to the verifier, the host may encrypt the seal key handle based on the second verification key, and send the encrypted seal key handle to the verifier.

In some embodiments, the unsealing request sent by the verifier is an unsealing request obtained after encryption by using the second verification key, and after the receiving an unsealing request sent by a verifier, the method further includes:

decrypting the first verification key based on the local key of the host, to obtain the second verification key; and decrypting, based on the second verification key, the encrypted unsealing request.

Similarly, to ensure security of the unsealing request sent by the verifier to the host, the verifier encrypts the unsealing request based on the second verification key, and sends the encrypted unsealing request. Therefore, when receiving the encrypted unsealing request, the host further needs to decrypt the encrypted unsealing request.

In some embodiments, the sending the verification information to the verifier includes:

decrypting the first verification key based on the local key of the host, to obtain the second verification key;

encrypting the verification information based on the second verification key, to obtain encrypted verification information; and sending the encrypted verification information to the verifier.

Similarly, to ensure security of the verification information sent by the host to the verifier, the host may encrypt the verification information based on the second verification key, and send the encrypted verification information to the verifier.

According to a second aspect, a method for determining a trust status of a TPM is provided, where the method is applied to a verifier, the verifier is any party that needs to determine the trust status of the TPM disposed in a host, and the method includes:

sending an unsealing request to the host, where the unsealing request carries a seal key handle; and the seal key handle is sent by the host to the verifier after the host seals PCR values in the TPM based on a first verification key when the host is in an initialization status, and the first verification key is obtained after the host encrypts, based on a local key of the host, a second verification key transmitted on an encrypted channel between the verifier and the host;

receiving verification information sent by the host, where the verification information is determined, after the host unseals current PCR values in the TPM based on the seal key handle, by the host based on an unseal verification key obtained after the unsealing; and determining the trust status of the TPM based on the verification information.

In this application, when the verifier needs to determine the trust status of the TPM in the host, the verifier sends the unsealing request to the host. The host unseals the current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization status, and the first verification key is obtained after the second verification key transmitted on the encrypted channel between the verifier and the host is encrypted based on the local key of the host. Therefore, in this application, any verifier that establishes an encrypted channel with the host can determine the trust status of the TPM in the host by using a second verification key transmitted on the encrypted channel and through sealing/unsealing performed by the host on PCR values in the TPM, and there is no need to pre-deploy a remote attestation server to determine the trust status of the TPM in the host. This improves flexibility of determining the trust status of the TPM.

In some embodiments, the unsealing request further carries a challenge value, the verification information includes a mapping value of the challenge value and trust status indication information, and the mapping value of the challenge value is determined by the host based on the challenge value and is used to indicate an identity of the host; and the determining the trust status of the TPM based on the verification information includes:

determining, based on the mapping value of the challenge value, whether the identity of the host is valid; and if the identity of the host is valid, determining the trust status of the TPM based on the trust status indication information.

Further, to improve security of information transmission between the host and the verifier, the unsealing request sent by the verifier to the host further carries the challenge value, so that when the verifier receives information sent by the host subsequently, the verifier may determine, based on the challenge value, whether the identity of the host is valid.

In some embodiments, the trust status indication information is the trust status of the TPM, and the trust status is trusted or untrusted.

In a possible implementation, the host may directly determine the trust status of the TPM based on the unseal verification key, and directly send the trust status of the TPM to the verifier.

In some embodiments, the local key of the host and a local key of the verifier are the same, and the trust status indication information is the unseal verification key; and the determining the trust status of the TPM based on the trust status indication information includes:

determining whether the unseal verification key and a third verification key are the same, where the third verification key is obtained by encrypting the second verification key based on the local key of the verifier; and if the unseal verification key and the third verification key are the same, determining that the trust status of the TPM is trusted; or if the unseal verification key and the third verification key are not the same, determining that the trust status of the TPM is untrusted.

In another possible implementation, when obtaining the unseal verification key, the host may send the unseal verification key to the verifier, and the verifier determines the trust status of the TPM based on the unseal verification key.

In some embodiments, before the sending an unsealing request to the host, the method further includes:

receiving the seal key handle sent by the host, and storing the seal key handle.

In this application, the unsealing request sent by the verifier to the host carries the seal key handle, and the seal key handle is obtained after the host seals the PCR values in the TPM. Therefore, the verifier further needs to receive the seal key handle sent by the host.

In some embodiments, before the receiving the seal key handle sent by the host, the method further includes:

generating the second verification key, and transmitting the second verification key on the encrypted channel; and encrypting the second verification key based on the local key of the verifier, to obtain and store the third verification key.

Further, in this application, the host performs the sealing by directly using the first verification key obtained after the second verification key transmitted on the encrypted channel between the host and the verifier is encrypted. Therefore, the verifier further needs to generate the second verification key, and transmit the second verification key on the encrypted channel.

In some embodiments, the seal key handle sent by the host is a seal key handle obtained after encryption by using the second verification key, and the storing the seal key handle includes:

decrypting the third verification key based on the local key of the verifier, to obtain the second verification key;

decrypting the encrypted seal key handle based on the second verification key, to obtain an unencrypted seal key handle;

encrypting the unencrypted seal key handle based on the local key of the verifier; and storing a seal key handle obtained after the encryption based on the local key of the verifier.

Further, to ensure security of the seal key handle stored in the verifier, the verifier stores the encrypted seal key handle.

In some embodiments, before the sending an unsealing request to the host, the method further includes:

decrypting the stored seal key handle based on the local key of the verifier, and adding a decrypted seal key handle to the unsealing request.

The verifier stores the encrypted seal key handle. Therefore, when the verifier needs to use the seal key handle, the verifier first needs to decrypt the encrypted seal key handle.

In some embodiments, the sending an unsealing request to the host includes:

decrypting the third verification key based on the local key of the verifier, to obtain the second verification key;

encrypting the unsealing request based on the second verification key, to obtain an encrypted unsealing request; and sending the encrypted unsealing request to the host.

To ensure security of the unsealing request sent by the verifier to the host, the verifier encrypts the unsealing request based on the second verification key, and sends the encrypted unsealing request.

In some embodiments, the verification information sent by the verifier is verification information obtained after encryption by using the second verification key, and before the determining the trust status of the TPM based on the verification information, the method further includes:

decrypting the third verification key based on the local key of the verifier, to obtain the second verification key; and decrypting, based on the second verification key, the encrypted verification information.

Similarly, to ensure security of the verification information sent by the host to the verifier, the host may encrypt the verification information based on the second verification key. Therefore, when receiving the verification information, the verifier further needs to decrypt the encrypted verification information.

According to a third aspect, an apparatus for determining a trust status of a TPM is provided, where the apparatus is a host. The TPM is disposed in the host, and the apparatus for determining the trust status of the TPM has functions of implementing behaviors in the method for determining the trust status of the TPM according to the first aspect. The apparatus for determining the trust status of the TPM includes at least one module, and the at least one module is configured to implement the method for determining the trust status of the TPM according to the first aspect.

According to a fourth aspect, an apparatus for determining a trust status of a TPM is provided, where the apparatus is a verifier. The verifier is any party that needs to determine the trust status of the TPM disposed in a host, and the apparatus for determining the trust status of the TPM has functions of implementing behaviors in the method for determining the trust status of the TPM according to the second aspect. The apparatus for determining the trust status of the TPM includes at least one module, and the at least one module is configured to implement the method for determining the trust status of the TPM according to the second aspect.

According to a fifth aspect, an apparatus for determining a trust status of a TPM is provided, where the apparatus is a host. The TPM is disposed in the host, and a structure of the apparatus for determining the trust status of the TPM includes a processor and a memory. The memory is configured to: store a program that supports the apparatus for determining the trust status of the TPM in performing the method for determining the trust status of the TPM according to the first aspect, and store data used to implement the method for determining the trust status of the TPM according to the first aspect. The processor is configured to execute the program stored in the memory. The apparatus for determining the trust status of the TPM may further include a communications bus, and the communications bus is configured to establish a connection between the processor and the memory.

According to a sixth aspect, an apparatus for determining a trust status of a TPM is provided, where the apparatus is a verifier. The verifier is any party that needs to determine the trust status of the TPM disposed in a host, and a structure of the apparatus for determining the trust status of the TPM includes a processor and a memory. The memory is configured to: store a program that supports the apparatus for determining the trust status of the TPM in performing the method for determining the trust status of the TPM according to the second aspect, and store data used to implement the method for determining the trust status of the TPM according to the second aspect. The processor is configured to execute the program stored in the memory. The apparatus for determining the trust status of the TPM, and the communications bus is configured to establish a connection between the processor and the memory.

According to a seventh aspect, a computer-readable storage medium is provided. The computer-readable storage medium stores an instruction, and when the instruction is run on a computer, the computer is enabled to perform the method for determining the trust status of the TPM according to the first aspect.

According to an eighth aspect, a computer-readable storage medium is provided. The computer-readable storage medium stores an instruction, and when the instruction is run on a computer, the computer is enabled to perform the method for determining the trust status of the TPM according to the second aspect.

According to a ninth aspect, a computer program product including an instruction is provided. When the computer program product runs on a computer, the computer performs the method for determining the trust status of the TPM according to the first aspect.

According to a tenth aspect, a computer program product including an instruction is provided. When the computer program product runs on a computer, the computer performs the method for determining the trust status of the TPM according to the second aspect.

Technical effects achieved in the third aspect, the fifth aspect, the seventh aspect, and the ninth aspect are similar to technical effects achieved by using corresponding technical means in the first aspect. Details are not described herein.

Technical effects achieved in the fourth aspect, the sixth aspect, the eighth aspect, and the tenth aspect are similar to technical effects achieved by using corresponding technical means in the second aspect. Details are not described herein.

The technical solutions provided in this application bring the following beneficial effects:

In this application, when the verifier needs to determine the trust status of the TPM in the host, the verifier sends the unsealing request to the host. The host unseals the current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization state, and the first verification key is obtained after the second verification key transmitted on the encrypted channel between the verifier and the host is encrypted based on the local key of the host. Therefore, in this application, any verifier that establishes an encrypted channel with the host can determine the trust status of the TPM in the host by using a second verification key transmitted on the encrypted channel and through sealing/unsealing performed by the host on PCR values in the TPM, and there is no need to pre-deploy a remote attestation server to determine the trust status of the TPM in the host. This improves flexibility of determining the trust status of the TPM.

DESCRIPTION OF EMBODIMENTS

To make the objectives, technical solutions, and advantages of this application clearer, the following further describes the embodiments of this application in detail with reference to the accompanying drawings.

Figure 1:
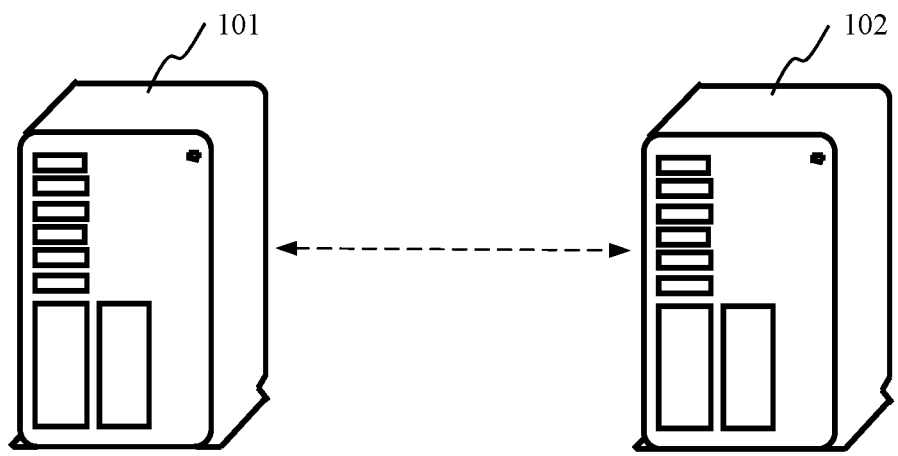
FIG. 1 is a schematic diagram of a system for determining a trust status of a TPM according to an embodiment of this application.

FIG. 1 is a schematic diagram of a system for determining a trust status of a TPM according to an embodiment of this application. As shown in FIG. 1, the system includes a host 101 and a verifier 102. The host 101 and the verifier 102 are connected in a wireless or wired manner to communicate with each other.

The TPM is deployed in the host 101, and the verifier 102 is configured to determine the trust status of the TPM deployed in the host 101. In other words, the host 101 and the verifier 102 are configured to perform the method for determining the trust status of the TPM provided in the embodiments of this application.

Specifically, the host 101 may be any server in which a TPM is deployed, and the verifier 102 may be a party that needs to determine a trust status of TPM in the server. For example, the host 101 may be a server in a bank system, and the verifier 102 may be a data center that needs to determine a trust status of the server.

In addition, the TPM deployed in the host 101 is also referred to as a TPM chip. In all the embodiments of this application, the TPM is used as an example for description.

Figure 2:
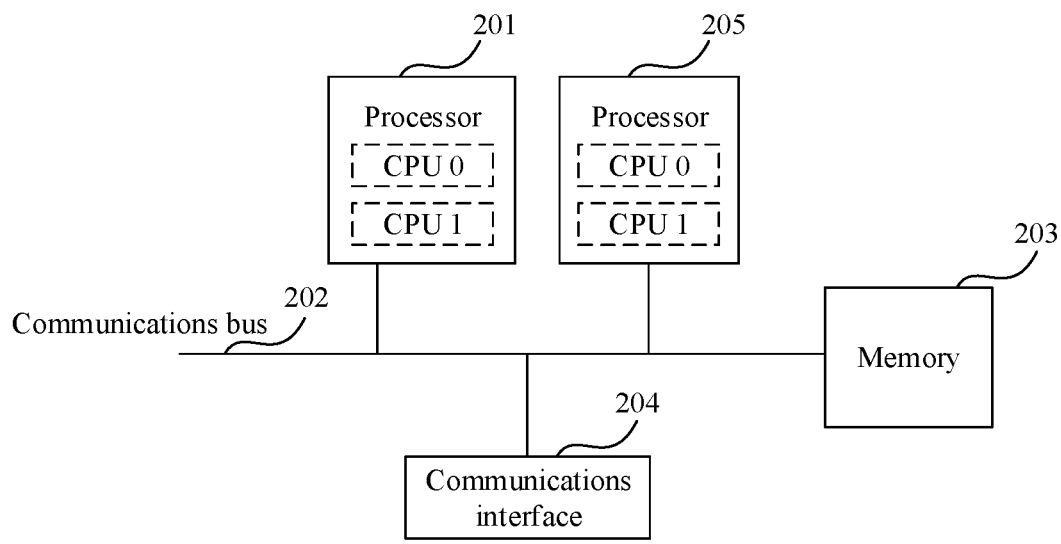
FIG. 2 is a schematic structural diagram of a host according to an embodiment of this application.

FIG. 2 is a schematic structural diagram of a host according to an embodiment of this application. Referring to FIG. 2, the host includes at least one processor 201, a communications bus 202, a memory 203, and at least one communications interface 204.

The processor 201 may be a general-purpose central processing unit (Central Processing Unit, CPU), a microprocessor, an application-specific integrated circuit (application-specific integrated circuit, ASIC), or one or more integrated circuits for controlling program execution of the solutions in this application.

The communications bus 202 may include a path, to transfer information between the foregoing components.

The memory 203 may be a read-only memory (ROM) or another type of static storage device that can store static information and instructions, or a random access memory (RAM) or another type of dynamic storage device that can store information and instructions. Alternatively, the memory 203 may be an electrically erasable programmable read-only memory (EEPROM), a compact disc read-only memory (CD-ROM) or another compact disc storage medium, an optical disc storage medium (including a compact optical disc, a laser disc, an optical disc, a digital versatile disc, a Blu-ray disc, or the like), a magnetic disk storage medium or another magnetic storage device, or any other medium that can be configured to carry or store expected program code in a form of an instruction or a data structure and that can be accessed by a computer. However, the memory 203 is not limited thereto. The memory 203 may exist independently and be connected to the processor 201 through the communications bus 202. Alternatively, the memory 203 may be integrated with the processor 201.

The communications interface 204, which uses any apparatus such as a transceiver, is configured to communicate with another device or communications network, such as the Ethernet, a radio access network (RAN), or a wireless local area network (WLAN).

During specific implementation, in an embodiment, the processor 201 may include one or more CPUs, for example, a CPU 0 and a CPU 1 shown in FIG. 2.

During specific implementation, in an embodiment, the host may include a plurality of processors, for example, the processor 201 and a processor 205 shown in FIG. 2. Each of the processors may be a single-core processor or a multi-core (multi-core) processor. The processor herein may be one or more devices, circuits, and/or processing cores for processing data (for example, computer program instructions).

The host may be a general-purpose host or a dedicated host. During specific implementation, the host may be a desktop computer, a portable computer, a network server, a personal digital assistant (PDA), a mobile phone, a tablet computer, a wireless terminal device, a communications device, or an embedded device. A type of the host is not limited in the embodiments of this application.

The memory 203 is configured to store program code for executing the solutions in this application, and the processor 201 controls execution of the program code. The processor 201 is configured to execute the program code stored in the memory 203. The program code may include one or more software modules. The processor 201 and the one or more software modules in the program code in the memory 203 may be used in the system for determining the trust status of the TPM shown in FIG. 1, to determine the trust status of the TPM in the host.

An embodiment of this application further provides a structure of a verifier. The verifier includes at least one processor, a communications bus, a memory, and at least one communications interface. Functions of the processor, the communications bus, the memory, and the communications interface that are included in the verifier are basically the same as the functions of the processor, the communications bus, the memory, and the communications interface in FIG. 2. Details are not described herein.

The following describes in detail a method for determining a trust status of a TPM provided in the embodiments of this application.

Figure 3:
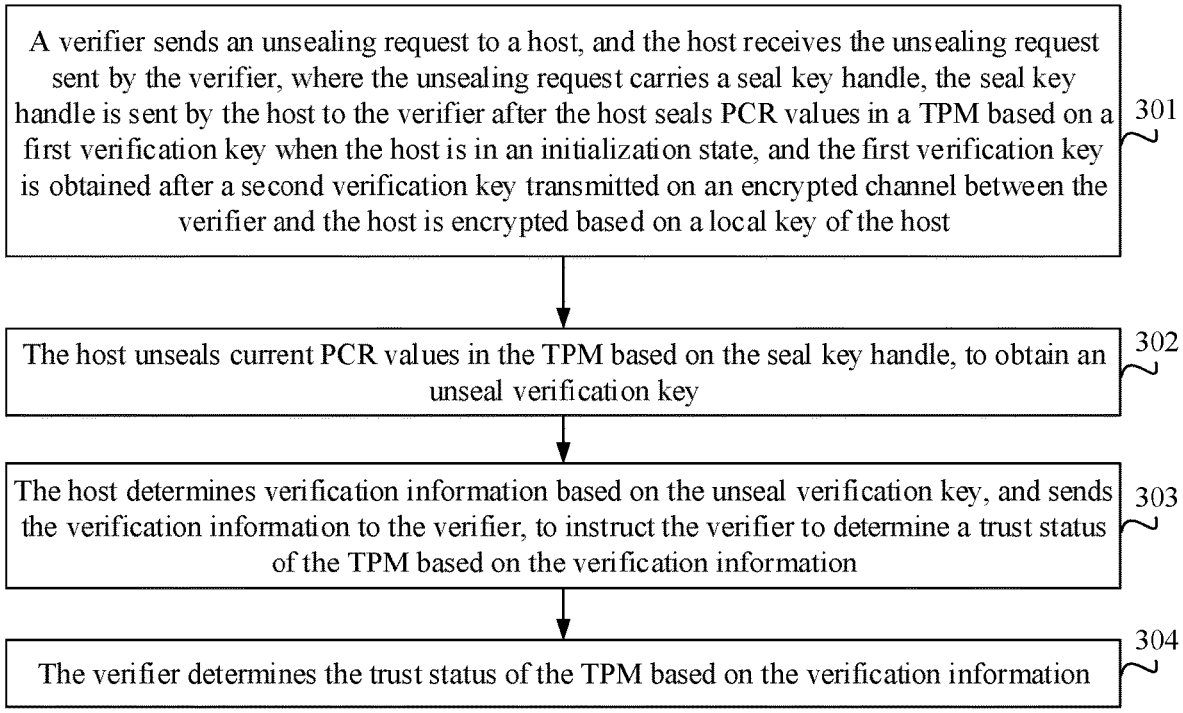
FIG. 3 is a flowchart of a method for determining a trust status of a TPM according to an embodiment of this application.

FIG. 3 is a flowchart of a method for determining a trust status of a TPM according to an embodiment of this application, and the method is applied to the system shown in FIG. 1. Specifically, as shown in FIG. 3, the method includes the following steps.

Step 301: A verifier sends an unsealing request to a host, and the host receives the unsealing request sent by the verifier, where the unsealing request carries a seal key handle, the seal key handle is sent by the host to the verifier after the host seals PCR values in the TPM based on a first verification key when the host is in an initialization status, and the first verification key is obtained after a second verification key transmitted on an encrypted channel between the verifier and the host is encrypted based on a local key of the host.

When the verifier needs to determine the trust status of the TPM in the host, the verifier may send the unsealing request to the host. The host and the verifier determine the trust status of the TPM by performing the following step 302 to step 304.

Step 302: The host unseals current PCR values in the TPM based on the seal key handle, to obtain an unseal verification key.

Because the unsealing request sent by the verifier carries the seal key handle, the host may unseal the current PCR values in the TPM based on the seal key handle.

Step 303: The host determines verification information based on the unseal verification key, and sends the verification information to the verifier, to instruct the verifier to determine the trust status of the TPM based on the verification information.

Further, after the unsealing, the host may determine the verification information based on the unseal verification key.

Step 304: The verifier determines the trust status of the TPM based on the verification information.

When the verifier receives the verification information, the verifier may determine the trust status of the TPM based on the verification information.

In this embodiment of this application, when the verifier needs to determine the trust status of the TPM in the host, the verifier sends the unsealing request to the host. The host unseals the current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization status, and the first verification key is obtained after the second verification key transmitted on the encrypted channel between the verifier and the host is encrypted based on the local key of the host. Therefore, in accordance with the disclosure, any verifier that establishes an encrypted channel with the host can use a second verification key transmitted on the encrypted channel, and determine the trust status of the TPM in the host through sealing/unsealing performed by the host on current PCR values in the TPM. This avoids pre-deployment of a remote attestation server to determine the trust status of the TPM in the host, and improves flexibility of determining the trust status of the TPM.

Figure 4:
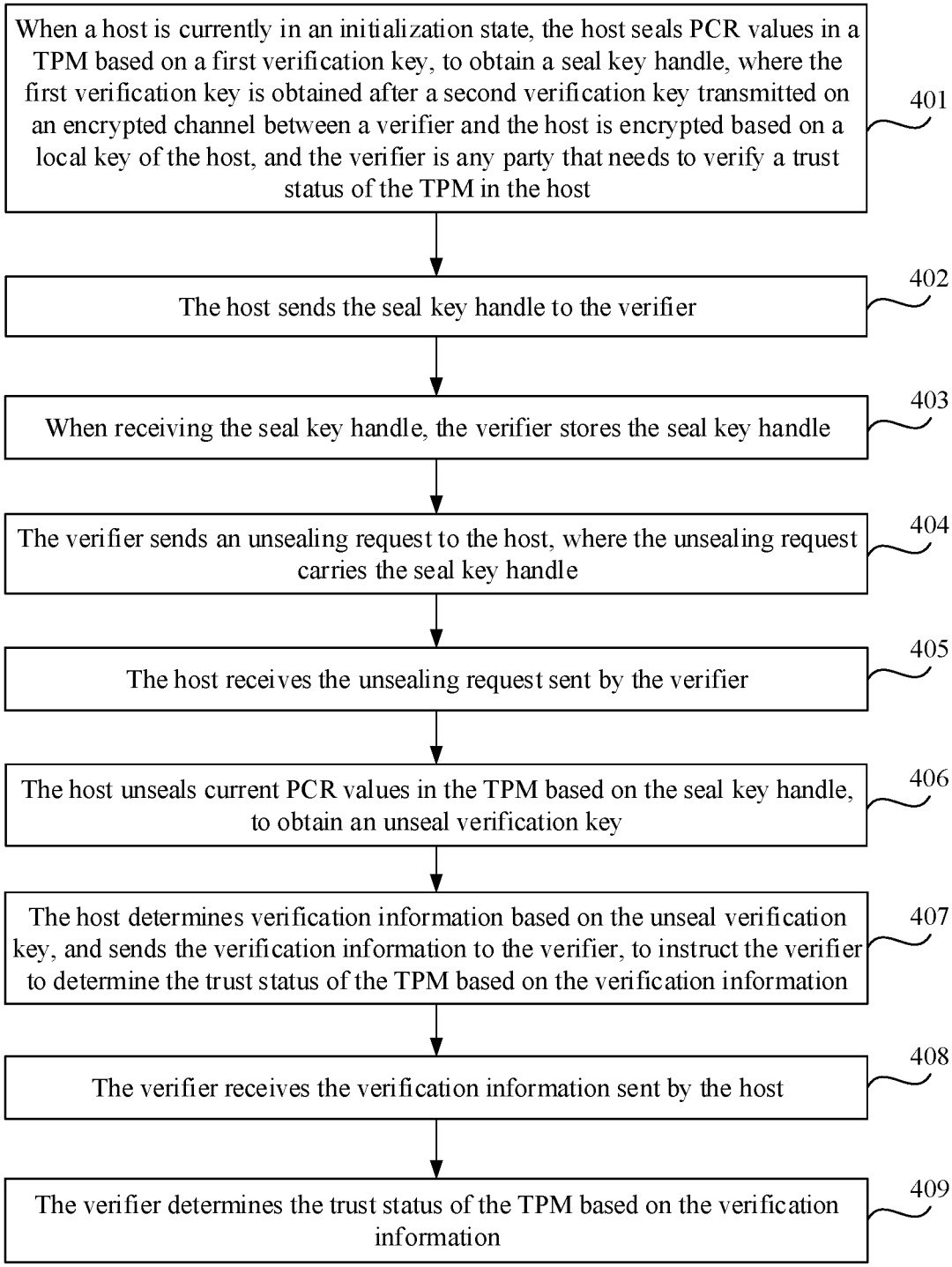
FIG. 4 is a flowchart of another method for determining a trust status of a TPM according to an embodiment of this application.

FIG. 4 is a flowchart of a method for determining a trust status of a TPM according to an embodiment of this application, and the method is applied to the system shown in FIG. 1. In addition, the embodiment shown in FIG. 4 is used to elaborate on the embodiment shown in FIG. 3. Specifically, as shown in FIG. 4, the method includes the following steps.

Step 401: When a host is currently in an initialization status, the host seals PCR values in the TPM based on a first verification key, to obtain a seal key handle, where the first verification key is obtained after a second verification key transmitted on an encrypted channel between a verifier and the host is encrypted based on a local key of the host, and the verifier is any party that needs to determine the trust status of the TPM in the host.

In this embodiment of this application, to help the verifier subsequently determine the trust status of the TPM deployed in the host, when the host is in the initialization status, the host first needs to record data in the TPM. Therefore, whether the data in the TPM is changed is subsequently determined based on the data in the TPM recorded when the host is in the initialization status, to determine the trust status of the TPM.

An implementation in which the host records the data in the TPM in the initialization status is as follows: The host records the data in the TPM in the initialization status according to step 401 by using a sealing function in sealing (sealing) and unsealing functions provided by the TPM.

For ease of description, the sealing and unsealing functions provided by the TPM are first described herein.

First, for PCRs in the TPM, to distinguish data stored at different storage locations in the host, the data at the different storage locations is stored in different PCRs. There are a plurality of PCRs in the TPM, and each PCR is configured to record a digest value of data at a storage location in the host. For example, there are 23 PCRs in the host, which are denoted as a PCR 1, a PCR 2, a PCR 3, . . . , a PCR 22, and a PCR 23. The 23 PCRs are configured to store digest values of data at different storage locations.

In addition, a corresponding sealing parameter (Data1) is set in the TPM. When the TPM needs to seal data in the TPM, sealing calculation is performed on the sealing parameter and current PCR values that correspond to specified PCRs in the TPM, to obtain and store a seal key handle.

Then, when the TPM needs to unseal the data in the TPM, unsealing calculation is performed on the stored seal key handle and the current PCR values corresponding to the specified PCRs in the TPM, to obtain an unsealing parameter (Data2). The TPM may compare the unsealing parameter with the sealing parameter. If the two parameters correspond to a same value, it indicates that the data corresponding to the specified PCRs in the TPM has not been tampered with. If the two parameters correspond to different values, it indicates that the data corresponding to the specified PCRs in the TPM has been tampered with.

It is clear that, in the sealing and unsealing functions provided by the TPM, the sealing parameter that is set in the TPM needs to be used to determine whether the data in the TPM has been tampered with. However, a corresponding sealing parameter is usually set in a host. In other words, each host has a corresponding sealing parameter. In addition, only the host can obtain the sealing parameter. Therefore, the sealing and unsealing functions can be used for the host only. In other words, the sealing and unsealing functions used by the host to determine whether the data in the TPM has been tampered with can be applied to the host only, but cannot be applied to the interaction between the host and the verifier.

Therefore, to enable the verifier to determine the trust status of the TPM by using the sealing and unsealing functions provided by the TPM in the host, a sealing parameter needs to be provided. The sealing parameter is available to both the verifier and the host, so as to resolve the foregoing problem that the sealing and unsealing functions can be applied to the host only.

In a process in which the verifier determines the trust status of the TPM in the host, the verifier and the host usually need to establish an encrypted channel first. The verifier generates a verification key (verification key), and shares the verification key on the encrypted channel, so that when the host and the verifier communicate with each other subsequently, the host and the verifier encrypt, based on the shared key, data to be transmitted to each other. In other words, after the encrypted channel is established between the host and the verifier, the verification key shared on the encrypted channel is available to both the host and the verifier at any time.

Therefore, in this embodiment of this application, the verification key shared on the encrypted channel may be used as the sealing parameter in the sealing function, to apply the sealing and unsealing functions to the interaction between the host and the verifier.

For any verifier, there is usually an encrypted channel between the verifier and the host. Therefore, in the foregoing manner, any verifier can determine the trust status of the TPM in the host. There is no need to pre-deploy a remote attestation server to determine the trust status of the TPM in the host, and flexibility of determining the trust status of the TPM is improved.

It should be further noted that, to ensure security of the verification key shared on the encrypted channel, the host encrypts, by using a local key of the host, the verification key shared on the encrypted channel and stores an encrypted verification key in the host; and the verifier encrypts, by using a local key of the verifier, the verification key shared on the encrypted channel and stores an encrypted verification key in the verifier. In other words, the host and the verifier store verification keys obtained after the encryption by using the local key of the host and the local key of the verifier. To avoid confusing different verification keys, the verification key shared on the encrypted channel is referred to as the second verification key, the verification key obtained after the host encrypts the second verification key by using the local key of the host is referred to as the first verification key, and the verification key obtained after the verifier encrypts the second verification key by using the local key of the verifier is referred to as a third verification key.

In other words, after the encrypted channel is established between the verifier and the host, the verifier generates the second verification key, transmits the second verification key on the encrypted channel, and encrypts the second verification key based on the local key of the verifier, to obtain and store the third verification key. The host obtains the second verification key on the encrypted channel, and encrypts the second verification key based on the local key of the host, to obtain and store the first verification key.

Therefore, in step 401, when the host is currently in the initialization status, the host may seal the PCR values in the TPM by using the first verification key as the sealing parameter in the sealing function, to obtain the seal key handle.

The initialization status of the host may be a status in which the host establishes a network link with the verifier for the first time and performs data communication with the verifier.

In addition, because there are a plurality of different PCRs in the TPM, that the host seals the PCR values in the TPM may be sealing PCR values corresponding to all the PCRs in the TPM, or may be sealing PCR values corresponding to specified PCRs in the TPM. This is not specifically limited in this embodiment of this application. For example, when the host is in the initialization status, the host may seal only PCR values corresponding to a PCR 0 and the PCR 6 in the TPM.

It should be further noted that, there may be a plurality of implementations of implementing the encrypted channel between the verifier and the host. For example, the encrypted channel may be established using a transport layer security (Transport Layer Security, TLS) protocol, the encrypted channel may be established using a secure shell framework SSH (Secure Shell, SSH) protocol, the encrypted channel may be established using a proprietary protocol, or the encrypted channel may be established using a portable storage device (for example, USB flash disk).

Step 402: The host sends the seal key handle to the verifier.

To ensure that the seal key handle sent by the host to the verifier is not hacked by a hacker, the host may encrypt the seal key handle and send an encrypted seal key handle to the verifier.

In addition, the host needs to encrypt the seal key handle in such a way that the verifier can decrypt the encrypted seal key handle. Therefore, the host needs to encrypt the seal key handle based on the second verification key. However, the host stores the verification key obtained after the second verification key is encrypted. In other words, the host stores the first verification key.

Therefore, step 402 may be specifically: the host decrypts the first verification key based on the local key of the host, to obtain the second verification key; encrypts, based on the second verification key, the seal key handle obtained in step 401, to obtain an encrypted seal key handle; and sends the encrypted seal key handle to the verifier.

Step 403: When receiving the seal key handle, the verifier stores the seal key handle.

It can be learned from step 402 that, to prevent the seal key handle from being hacked by the hacker, the seal key handle sent by the host to the verifier is the seal key handle obtained after the encryption based on the second verification key. Therefore, the seal key handle received by the verifier is also the encrypted seal key handle, that is, the verifier needs to decrypt the received seal key handle, to obtain the seal key handle obtained in step 401.

Therefore, step 403 may be specifically: when the verifier receives the seal key handle, the verifier decrypts the third verification key based on the local key of the verifier, to obtain the second verification key; and decrypts the encrypted seal key handle based on the second verification key, to obtain an unencrypted seal key handle.

After obtaining the unencrypted seal key handle, the verifier further needs to store the seal key handle, so as to subsequently determine the trust status of the TPM in the host based on the seal key handle.

Further, to ensure security of the stored seal key handle, the verifier may encrypt the unencrypted seal key handle based on the local key of the verifier, and store a seal key handle obtained after the encryption based on the local key of the verifier. In other words, the verifier stores the seal key handle obtained after the encryption based on the local key of the verifier.

When the verifier stores the seal key handle, the verifier may determine the trust status of the TPM in the host by performing the following step 404 to step 409. The verifier may determine the trust status of the TPM in the host by performing the following step 404 to step 409 on any occasion.

Step 404: The verifier sends an unsealing request to the host, where the unsealing request carries the seal key handle.

In this embodiment of this application, the verifier determines the trust status of the TPM in the host by using the unsealing function provided by the TPM. Therefore, when the verifier needs to determine the trust status of the TPM in the host, the verifier needs to send the unsealing request to the host, and the unsealing request carries the prestored seal key handle.

It can be learned from step 403 that, the verifier stores the seal key handle obtained after the encryption based on the local key of the verifier. If the encrypted seal key handle is directly sent to the host, the host cannot obtain the unencrypted seal key handle. Therefore, that the verifier sends an unsealing request to the host may be specifically: decrypting, by the verifier, the stored seal key handle based on the local key of the verifier, and adding a decrypted seal key handle to the unsealing request.

Further, to help the verifier subsequently verify whether information sent by the host is valid, the unsealing request may further carry a challenge value (N). When the host returns the information to the verifier, the information may further carry a mapping value (f(N)) of the challenge value. The verifier may determine, based on the mapping value of the challenge value, whether an identity of the host is valid.

In addition, to ensure that the unsealing request sent by the verifier to the host is not hacked by a hacker, the verifier may encrypt the unsealing request and send an encrypted unsealing request to the host.

In other words, the verifier decrypts the third verification key based on the local key of the verifier, to obtain the second verification key; encrypts the unsealing request based on the second verification key, to obtain an encrypted unsealing request; and sends the encrypted unsealing request to the host.

Step 405: The host receives the unsealing request sent by the verifier.

It can be learned from step 404 that, the unsealing request sent by the verifier is the encrypted unsealing request. Therefore, when receiving the unsealing request sent by the verifier, the host further needs to decrypt the first verification key based on the local key of the host, to obtain the second verification key, and decrypt the encrypted unsealing request based on the second verification key, to obtain the seal key handle carried in the unsealing request.

Step 406: The host unseals current PCR values in the TPM based on the seal key handle, to obtain an unseal verification key.

When the host obtains the seal key handle by performing step 405, unsealing calculation may be performed on the current PCR values in the TPM and the seal key handle, to obtain the unseal verification key.

It should be noted that, in step 406, the host still performs unsealing calculation for the same PCRs as those for which the host performs sealing calculation in step 401, to determine whether data in the PCRs is changed. For example, the host performs sealing calculation on the PCR values in the PCR 0 and the PCR 6 in step 401, and in step 406, the host performs unsealing calculation on current PCR values in the PCR 0 and the PCR 6.

Step 407: The host determines verification information based on the unseal verification key, and sends the verification information to the verifier, to instruct the verifier to determine the trust status of the TPM based on the verification information.

It can be learned from step 404 that, the unsealing request sent by the verifier to the host further carries the challenge value. Therefore, that the host determines verification information based on the unseal verification key may be specifically: determining the mapping value of the challenge value based on the challenge value, where the mapping value of the challenge value is used to indicate the identity of the host; determining trust status indication information based on the unseal verification key; and determining the trust status indication information and the mapping value of the challenge value as the verification information.

The determining, by the host, the mapping value of the challenge value based on the challenge value may be: determining, by the host, the mapping value of the challenge value in a preset mapping manner, where the preset mapping manner is a mapping manner preset in the host and the verifier.

The preset mapping manner may be adding 1 to the challenge value. In other words, when receiving the challenge value sent by the verifier, the host adds 1 to the challenge value, and determines a value obtained after 1 is added to the challenge value as the mapping value of the challenge value. Certainly, the preset mapping manner may be another mapping manner. This is not specifically limited in this embodiment of this application.

In addition, there are the following two possible implementations in which the host determines the trust status indication information based on the unseal verification key.

In a first implementation, because the host performs sealing calculation based on the first verification key in step 401, when the host obtains the unseal verification key by performing step 406, the host may directly determine whether the unseal verification key and the first verification key are the same. If the unseal verification key and the first verification key are the same, it is determined that the PCR values in the corresponding PCRs have not been changed, in other words, the host determines that the current trust status of the TPM is trusted.

Correspondingly, if the unseal verification key and the first verification key are not the same, it is determined that the PCR values in the corresponding PCRs have been changed, in other words, the host determines that the current trust status of the TPM is untrusted.

In other words, the host may directly determine the trust status of the TPM based on whether the unseal verification key and the first verification key are the same, and determine the trust status of the TPM as the trust status indication information. The trust status of the TPM is trusted or untrusted.

In a second implementation, in some scenarios, the local key of the host is the same as the local key of the verifier, in other words, the first verification key stored in the host is also the same as the third verification key stored in the verifier. In this case, the host may directly determine the unseal verification key as the trust status indication information, and send the trust status indication information to the verifier. The verifier determines the trust status of the TPM based on the unseal verification key.

Further, to ensure that the verification information sent by the host to the verifier is not hacked by a hacker, the host may encrypt the verification information and send encrypted verification information to the verifier.

In other words, the host decrypts the first verification key based on the local key of the host, to obtain the second verification key; encrypts the verification information based on the second verification key, to obtain encrypted verification information; and sends the encrypted verification information to the verifier.

Step 408: The verifier receives the verification information sent by the host.

It can be learned from step 407 that, the verification information sent by host to the verifier is the verification information obtained after the encryption based on the second verification key. Therefore, when receiving the verification information sent by the host, the verifier further needs to decrypt the third verification key based on the local key of the verifier, to obtain the second verification key, and decrypt the encrypted verification information based on the second verification key, to obtain information included in the verification information.

Step 409: The verifier determines the trust status of the TPM based on the verification information.

It can be learned from step 407 that, the verification information includes the mapping value of the challenge value and the trust status indication information. Therefore, step 409 may be specifically: determining, by the verifier based on the mapping value of the challenge value, whether the identity of the host is valid; and if the identity of the host is valid, determining the trust status of the TPM based on the trust status indication information.

When the verifier determines, based on the mapping value of the challenge value, that the identity of the host is invalid, it indicates that a party currently sending the verification information is not the host in which the trust status of the TPM needs to be determined by the verifier. In this case, the verifier does not need to continue to determine the trust status of the TPM based on the trust status indication information.

The determining, by the verifier based on the mapping value of the challenge value, whether the identity of the host is valid may be specifically: determining, by the verifier, a mapping value of the challenge value in a preset mapping manner; and if the determined mapping value and the mapping value sent by the host are the same, determining that the identity of the host is valid; or if the determined mapping value and the mapping value sent by the host are not the same, determining that the identity of the host is invalid.

The preset mapping manner is the mapping manner used by the host to determine the mapping value of the challenge value in step 407.

In addition, it can be learned from step 407 that there are two possible implementations in which the host determines the trust status indication information. Therefore, there are also two corresponding implementations in which the verifier determines the trust status of the TPM based on the trust status indication information.

For the first implementation in step 407, the trust status indication information is the trust status of the TPM, and the trust status is trusted or untrusted. Therefore, the verifier may directly determine, based on the trust status indication information, whether the trust status of the TPM is trusted or untrusted.

In other words, when the trust status indication information is trusted, the verifier directly determines that the trust status of the TPM is trusted; when the trust status indication information is untrusted, the verifier directly determines that the trust status of the TPM is untrusted.

For the second implementation in step 407, the trust status indication information is the unseal verification key, and the local key of the host is the same as the local key of the verifier, in other words, the first verification key is the same as the third verification key. Therefore, that the verifier determines the trust status of the TPM based on the trust status indication information may be specifically: determining, by the verifier, whether the unseal verification key and the third verification key are the same; and if the unseal verification key and the third verification key are the same, determining that the trust status of the TPM is trusted; or if the unseal verification key and the third verification key are not the same, determining that the trust status of the TPM is untrusted.

In other words, when the local key of the host is the same as the local key of the verifier, the host does not determine the trust status of the TPM based on the unseal verification key obtained after the decryption and the first verification key, but the verifier determines the trust status of the TPM instead based on the unseal verification key obtained by the host through unsealing and the third verification key.

In this embodiment of this application, when the verifier needs to determine the trust status of the TPM in the host, the verifier sends the unsealing request to the host. The host unseals the current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization state, and the first verification key is obtained after the second verification key transmitted on the encrypted channel between the verifier and the host is encrypted based on the local key of the host. Therefore, in this application, any verifier that establishes an encrypted channel with the host can determine the trust status of the TPM in the host based on a second verification key transmitted on the encrypted channel, and there is no need to pre-deploy a remote attestation server to determine the trust status of the TPM. This improves flexibility of determining the trust status of the TPM.

Figure 5:
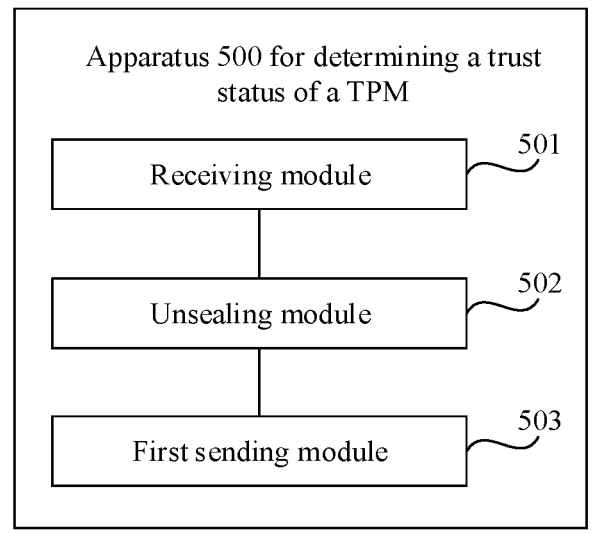
FIG. 5 is a block diagram of an apparatus for determining a trust status of a TPM according to an embodiment of this application.

FIG. 5 shows an apparatus 500 for determining a trust status of a TPM according to an embodiment of this application. The apparatus 500 is a host, the TPM is disposed in the host, and the apparatus 500 includes a receiving module 501, an unsealing module 502, and a first sending module 503.

The receiving module 501 is configured to perform step 405 in the embodiment in FIG. 4.

The seal key handle is sent by the host to the verifier after the host seals PCR values in the TPM based on a first verification key when the host is in an initialization state. The first verification key is obtained after a second verification key transmitted on an encrypted channel between the verifier and the host is encrypted based on a local key of the host. The verifier is any party that needs to determine the trust status of the TPM.

The unsealing module 502 is configured to perform step 406 in the embodiment in FIG. 4.

The first sending module 503 is configured to perform step 407 in the embodiment in FIG. 4.

In some embodiments, the unsealing request further carries a challenge value, and the first sending module 503 includes:
a first determining unit, configured to determine a mapping value of the challenge value based on the challenge value, where the mapping value of the challenge value is used to indicate an identity of the host;
a second determining unit, configured to determine trust status indication information based on the unseal verification key; and
a third determining unit, configured to determine the trust status indication information and the mapping value of the challenge value as the verification information.

In some embodiments, the second determining unit is configured to:
determine the trust status of the TPM based on whether the unseal verification key and the first verification key are the same, where the trust status is trusted or untrusted; and
determine the trust status of the TPM as the trust status indication information.

In some embodiments, the local key of the host and a local key of the verifier are the same, and
the second determining unit is specifically configured to:
determine the unseal verification key as the trust status indication information.

In some embodiments, the apparatus 500 further includes:
a sealing module, configured to perform step 401 in the embodiment in FIG. 4; and
a second sending module, configured to perform step 402 in the embodiment in FIG. 4.

In some embodiments, the apparatus 500 further includes:
an obtaining module, configured to obtain the second verification key on the encrypted channel; and
an encryption module, configured to encrypt the second verification key based on the local key of the host, to obtain and store the first verification key.

In some embodiments, the second sending module is specifically configured to:
decrypt the first verification key based on the local key of the host, to obtain the second verification key;
encrypt the seal key handle based on the second verification key, to obtain an encrypted seal key handle; and
send the encrypted seal key handle to the verifier.

In some embodiments, the unsealing request sent by the verifier is a request obtained after encryption by using the second verification key, and
the receiving module 501 is further configured to:
decrypt the first verification key based on the local key of the host, to obtain the second verification key; and
decrypt, based on the second verification key, the encrypted unsealing request.

In some embodiments, the first sending module 503 is further configured to:
decrypt the first verification key based on the local key of the host, to obtain the second verification key;
encrypt the verification information based on the second verification key, to obtain encrypted verification information; and
send the encrypted verification information to the verifier.

In this embodiment of this application, when the verifier needs to determine the trust status of the TPM in the host, the verifier sends the unsealing request to the host. The host unseals the current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization state, and the first verification key is obtained after the second verification key transmitted on the encrypted channel between the verifier and the host is encrypted based on the local key of the host. Therefore, in this application, any verifier that establishes an encrypted channel with the host can determine the trust status of the TPM in the host based on a second verification key transmitted on the encrypted channel, and there is no need to pre-deploy a remote attestation server to determine the trust status of the TPM. This improves flexibility of determining the trust status of the TPM.

Figure 6:
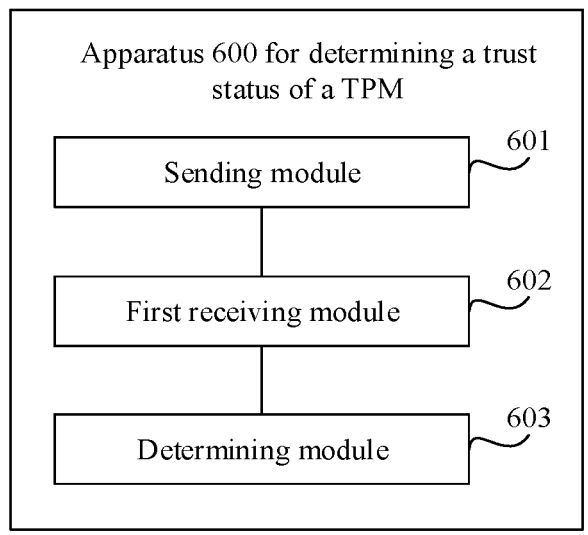
FIG. 6 is a block diagram of another apparatus for determining a trust status of a TPM according to an embodiment of this application.

FIG. 6 shows an apparatus 600 for determining a trust status of a TPM according to an embodiment of this application. The apparatus 600 is a verifier, the verifier is any party that needs to determine the trust status of the TPM disposed in a host, and the apparatus 600 includes a sending module 601, a first receiving module 602, and a determining module 603.

The sending module 601 is configured to perform step 404 in the embodiment in FIG. 4.

The seal key handle is sent by the host to the verifier after the host seals PCR values in the TPM based on a first verification key when the host is in an initialization state. The first verification key is obtained after the host encrypts, based on a local key of the host, a second verification key transmitted on an encrypted channel between the verifier and the host.

The first receiving module 602 is configured to perform step 408 in the embodiment in FIG. 4.

The determining module 603 is configured to perform step 409 in the embodiment in FIG. 4.

In some embodiments, the unsealing request further carries a challenge value, the verification information includes a mapping value of the challenge value and trust status indication information, and the mapping value of the challenge value is determined by the host based on the challenge value and is used to indicate an identity of the host; and the determining module 603 includes:

a first determining unit, configured to determine, based on the mapping value of the challenge value, whether the identity of the host is valid; and a second determining unit, configured to: if the identity of the host is valid, determine the trust status of the TPM based on the trust status indication information.

In some embodiments, the trust status indication information is the trust status of the TPM, and the trust status is trusted or untrusted.

In some embodiments, the local key of the host and a local key of the verifier are the same, and the trust status indication information is the unseal verification key; and the second determining unit is specifically configured to:

determine whether the unseal verification key and a third verification key are the same, where the third verification key is obtained by encrypting the second verification key based on the local key of the verifier; and if the unseal verification key and the third verification key are the same, determine that the trust status of the TPM is trusted; or if the unseal verification key and the third verification key are not the same, determine that the trust status of the TPM is untrusted.

In some embodiments, the apparatus further includes:

a second receiving module, configured to perform step 403 in the embodiment in FIG. 4.

In some embodiments, the apparatus further includes:

a generation module, configured to: generate the second verification key, and transmit the second verification key on the encrypted channel; and an encryption module, configured to encrypt the second verification key based on the local key of the verifier, to obtain and store the third verification key.

In some embodiments, the seal key handle sent by the host is a seal key handle obtained after encryption by using the second verification key, and the second receiving module is specifically configured to:

decrypt the third verification key based on the local key of the verifier, to obtain and store the second verification key;

decrypt the encrypted seal key handle based on the second verification key, to obtain an unencrypted seal key handle;

encrypt the unencrypted seal key handle based on the local key of the verifier; and store a seal key handle obtained after the encryption based on the local key of the verifier.

In some embodiments, the sending module is further configured to:

decrypt the stored seal key handle based on the local key of the verifier, and add a decrypted seal key handle to the unsealing request.

In some embodiments, the sending module is specifically configured to:

decrypt the third verification key based on the local key of the verifier, to obtain the second verification key;

encrypt the unsealing request based on the second verification key, to obtain an encrypted unsealing request; and send the encrypted unsealing request to the host.

In some embodiments, the verification information sent by the verifier is verification information obtained after encryption by using the second verification key, and the determining module is further configured to:

decrypt the third verification key based on the local key of the verifier, to obtain the second verification key; and decrypt, based on the second verification key, the encrypted verification information.

In this embodiment of this application, when the verifier needs to determine the trust status of the TPM in the host, the verifier sends the unsealing request to the host. The host unseals current PCR values in the TPM based on the seal key handle carried in the unsealing request, and sends the verification information to the verifier based on the unseal verification key obtained after the unsealing. The verifier determines the trust status of the TPM based on the verification information. The seal key handle is sent by the host to the verifier after the host seals the PCR values in the TPM based on the first verification key when the host is in the initialization state, and the first verification key is obtained after the second verification key transmitted on the encrypted channel between the verifier and the host is encrypted based on the local key of the host. Therefore, in this application, any verifier that establishes an encrypted channel with the host can determine the trust status of the TPM in the host based on a second verification key transmitted on the encrypted channel, and there is no need to pre-deploy a remote attestation server to determine the trust status of the TPM. This improves flexibility of determining the trust status of the TPM.

It should be noted that, when the apparatus for determining the trust status of the TPM provided in the foregoing embodiments determines the trust status of the TPM, division into the foregoing functional modules is merely used as an example for description. In an actual application, the foregoing functions can be allocated to different functional modules and implemented based on requirements. To be specific, an inner structure of a device is divided into different functional modules to implement all or some of the functions described above. In addition, the apparatus for determining the trust status of the TPM provided in the foregoing embodiments and the embodiments of the method for determining the trust status of the TPM belong to a same conception. For a specific implementation process of the apparatus for determining the trust status of the TPM, refer to the method embodiments. Details are not described herein.

All or some of the foregoing embodiments may be implemented by software, hardware, firmware, or any combination thereof. When software is used to implement the embodiments, the embodiments may be all or partially implemented in a form of a computer program product. The computer program product includes one or more computer instructions. When the computer instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (Digital Subscriber Line, DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD), a semiconductor medium (for example, a solid-state drive (SSD)), or the like.

A person of ordinary skill in the art may understand that all or some of the steps of the embodiments may be implemented by hardware or a program instructing related hardware. The program may be stored in a computer-readable storage medium. The storage medium may be a read-only memory, a magnetic disk, an optical disc, or the like.

The foregoing descriptions are merely embodiments of this application, but are not intended to limit this application. Any modification, equivalent replacement, or improvement made without departing from the principle of this application should fall within the protection scope of this application.

What is claimed is:

1. A method for determining a trust status of a trusted platform module (TPM), wherein the method is applied to a host, the TPM is disposed in the host, and the method comprises:

receiving an unsealing request sent by a verifier, wherein the unsealing request carries a seal key handle, wherein the seal key handle is sent by the host to the verifier after the host seals platform configuration register (PCR) values in the TPM based on a first verification key when the host is in an initialization state, wherein the first verification key is obtained after a second verification key transmitted on an encrypted channel between the verifier and the host is encrypted based on a local key of the host, and the verifier is any party to verify the trust status of the TPM;

unsealing current PCR values in the TPM based on the seal key handle, to obtain an unseal verification key; and determining verification information based on the unseal verification key, and sending the verification information to the verifier, to instruct the verifier to determine the trust status of the TPM based on the verification information.

2. The method according to claim 1, wherein the unsealing request further carries a challenge value, and determining verification information based on the unseal verification key comprises:

determining a mapping value of the challenge value based on the challenge value, wherein the mapping value of the challenge value indicates an identity of the host;

determining trust status indication information based on the unseal verification key; and determining the trust status indication information and the mapping value of the challenge value as the verification information.

3. The method according to claim 2, wherein determining trust status indication information based on the unseal verification key comprises:

determining the trust status of the TPM based on whether the unseal verification key and the first verification key are the same, wherein the trust status is trusted or untrusted; and determining the trust status of the TPM as the trust status indication information.

4. The method according to claim 2, wherein the local key of the host and a local key of the verifier are the same, and, wherein determining the trust status indication information based on the unseal verification key comprises:

determining the unseal verification key as the trust status indication information.

5. The method according to claim 1, wherein before receiving the unsealing request sent by a verifier, the method further comprises:

when the host is currently in the initialization state, sealing the PCR values in the TPM based on the first verification key, to obtain the seal key handle; and sending the seal key handle to the verifier.

6. The method according to claim 5, wherein before sealing the PCR values in the TPM based on the first verification key, the method further comprises:

obtaining the second verification key on the encrypted channel; and encrypting the second verification key based on the local key of the host, to obtain and store the first verification key.

7. A method for determining a trust status of a trusted platform module (TPM), wherein the method is applied to a verifier, the verifier is any party to determine the trust status of the TPM disposed in a host, and the method comprises:

sending an unsealing request to the host, wherein the unsealing request carries a seal key handle, wherein the seal key handle is sent by the host to the verifier after the host seals platform configuration register PCR values in the TPM based on a first verification key when the host is in an initialization state, and the first verification key is obtained after the host encrypts, based on a local key of the host, a second verification key transmitted on an encrypted channel between the verifier and the host;

receiving verification information sent by the host, wherein the verification information is determined, after the host unseals current PCR values in the TPM based on the seal key handle, by the host based on an unseal verification key obtained after the unsealing; and determining the trust status of the TPM based on the verification information.

8. The method according to claim 7, wherein the unsealing request further carries a challenge value, the verification information comprises a mapping value of the challenge value and trust status indication information, and the mapping value of the challenge value is determined by the host based on the challenge value and indicates an identity of the host; and, wherein determining the trust status of the TPM based on the verification information comprises:

determining, based on the mapping value of the challenge value, whether the identity of the host is valid; and if the identity of the host is valid, determining the trust status of the TPM based on the trust status indication information.

9. The method according to claim 8, wherein the trust status indication information is the trust status of the TPM, and the trust status is trusted or untrusted.

10. The method according to claim 8, wherein the local key of the host and a local key of the verifier are the same, and the trust status indication information is the unseal verification key; and, wherein determining the trust status of the TPM based on the trust status indication information comprises:

determining whether the unseal verification key and a third verification key are the same, wherein the third verification key is obtained by encrypting the second verification key based on the local key of the verifier;

if the unseal verification key and the third verification key are the same, determining that the trust status of the TPM is trusted; and if the unseal verification key and the third verification key are not the same, determining that the trust status of the TPM is untrusted.

11. The method according to claim 7, wherein before sending the unsealing request to the host, the method further comprises:

receiving the seal key handle sent by the host, and storing the seal key handle.

12. The method according to claim 11, wherein before receiving the seal key handle sent by the host, the method further comprises:

generating the second verification key, and transmitting the second verification key on the encrypted channel; and encrypting the second verification key based on the local key of the verifier, to obtain and store the third verification key.

13. An apparatus for determining a trust status of a trusted platform module (TPM), wherein the apparatus is a host, the TPM is disposed in the host, and the apparatus comprises:

one or more processors; and non-transitory computer-readable memory storing a program to be executed by the one or more processors, the program including instructions to:

a processor configured to execute computer program modules comprising:

a receiving module, configured to receive an unsealing request sent by a verifier, wherein the unsealing request carries a seal key handle, wherein the seal key handle is sent by the host to the verifier after the host seals platform configuration register (PCR) values in the TPM based on a first verification key when the host is in an initialization state, the first verification key is obtained after a second verification key transmitted on an encrypted channel between the verifier and the host is encrypted based on a local key of the host, and the verifier is any party that needs to determine the trust status of the TPM;

unseal current PCR values in the TPM based on the seal key handle, to obtain an unseal verification key; and determine verification information based on the unseal verification key, and send the verification information to the verifier, to instruct the verifier to determine the trust status of the TPM based on the verification information.

14. The apparatus according to claim 13, wherein the unsealing request further carries a challenge value, and the program includes instructions to:

determine a mapping value of the challenge value based on the challenge value, wherein the mapping value of the challenge value is used to indicate an identity of the host;

determine trust status indication information based on the unseal verification key; and determine the trust status indication information and the mapping value of the challenge value as the verification information.

15. The apparatus according to claim 14, wherein the program includes instructions to:

determine the trust status of the TPM based on whether the unseal verification key and the first verification key are the same, wherein the trust status is trusted or untrusted; and determine the trust status of the TPM as the trust status indication information.

16. The apparatus according to claim 14, wherein the local key of the host and a local key of the verifier are the same, and the program includes instructions to:

determine the unseal verification key as the trust status indication information.

17. The apparatus according to claim 13, wherein the program includes instructions to:

seal the PCR values in the TPM based on the first verification key, to obtain the seal key handle when the host is currently in the initialization state; and send the seal key handle to the verifier.

18. The apparatus according to claim 17, wherein the program includes instructions to:

obtain the second verification key on the encrypted channel; and encrypt the second verification key based on the local key of the host, to obtain and store the first verification key.

* * * * *